UNITED STATES PATENT OFFICE.

MARTIN VAN B. WATTS, OF BROOKHAVEN, MISSISSIPPI.

LINIMENT.

SPECIFICATION forming part of Letters Patent No. 230,365, dated July 20, 1880.

Application filed April 19, 1880. (No specimens.)

*To all whom it may concern:*

Be it known that I, MARTIN VAN B. WATTS, of Brookhaven, in the county of Lincoln and State of Mississippi, have invented certain new and useful Improvements in Liniments; and I do hereby declare the following to be a full, clear, and exact description of the invention, such as will enable others skilled in the art to which it pertains to make and use it.

My invention relates to an improvement in liniments for the treatment of all pains, neuralgia, rheumatism, pains in the back, shoulders, and chest, weak back, stiff joints and limbs, mumps, sore throat, inflammatory swellings, boils, &c.

In making my liniment I take two pounds of wild thistle, stems and all, and put in two gallons of water and boil down to one-half gallon; one pound of wild-cherry bark, and put in one gallon of water and boil down to one quart; and one pound of spear-mint, and put in one gallon of water and boil down to one quart. Of each of these decoctions of wild thistle, spear-mint, and wild-cherry bark I take of each, in equal parts, enough to make two ounces; coal-oil, one ounce; spirits turpentine, one ounce; essence peppermint, one ounce; bicarbonate soda, one dram; liquid ammonia, twenty drops; camphor, one dram.

The ingredients are to be thoroughly compounded and used externally.

Having thus described my invention, I claim—

A liniment composed of wild cherry, wild thistle, spear-mint, coal-oil, spirits turpentine, essence peppermint, bicarbonate soda, liquid ammonia, and camphor, in or about the proportions substantially as specified.

In testimony that I claim the foregoing I have hereunto set my hand this 13th day of April, 1880.

MARTIN VAN B. WATTS.

Witnesses:
   J. M. H. MARTIN,
   I. WARREN.